Aug. 15, 1961 A. V. LORD ET AL 2,996,581

QUANTISING OF TELEVISION SIGNALS

Filed Dec. 10, 1956 3 Sheets-Sheet 1

INVENTORS
Arthur V. Lord
Reginald F. Vigurs
BY
Ralph B. Stewart
ATTORNEY

INVENTORS
Arthur V. Lord
Reginald F. Vigurs
BY
Ralph B. Stewart
ATTORNEY

Aug. 15, 1961 A. V. LORD ET AL 2,996,581

QUANTISING OF TELEVISION SIGNALS

Filed Dec. 10, 1956 3 Sheets-Sheet 3

INVENTORS
Arthur V. Lord
Reginald F. Viguers
BY
Ralph B. Stewart
ATTORNEY

United States Patent Office 2,996,581

Patented Aug. 15, 1961

2,996,581

QUANTISING OF TELEVISION SIGNALS

Arthur Valentine Lord, Banstead, and Reginald Frederick Vigurs, Coulsdon, England, assignors to Marconi's Wireless Telegraph Company Limited and Standard Telephones & Cables Limited, London, England Filed Dec. 10, 1956, Ser. No. 627,383
Claims priority, application Great Britain Dec. 16, 1955
5 Claims. (Cl. 179—15.55)

The present invention relates to the quantising of television signals.

An arrangement has been proposed in which a television signal is quantised and converted into a train of pulses defining changes in amplitude of the quantised signal and a train of pulses defining the times of such changes, and the pulses of each of these trains are converted into trains in which the pulses are equally spaced in time.

It has been noted that, within a given interval of time, the number of data that must be transmitted to represent a given television signal will be directly dependent upon the number of possible amplitude levels provided for in the quantising. Consequently, in the converted trains containing equally spaced pulses, the intervals between successive pulses will be inversely related to the said number of amplitude levels which are to be accommodated. Since the band-width necessary in the channel conveying the converted signals is itself inversely related to the time interval between the pulses in the converted trains, it follows that, for a given input signal, the bandwidth required for transmission of the converted signal will be directly dependent upon the number of possible amplitude levels in the quantiser.

The present invention has for one of its objects to make use of the relationships described in the preceding paragraph in order to make better use of the bandwidth available at times when the television signal contains only components of relatively low frequency.

Quantisers having a number of amplitude levels which is variable as described are also of value for other purposes, for instance in tele-recording. For this purpose it may sometimes be advantageous to quantise the television signals, before they are applied to a picture reproducer from which a motion picture film is made, in order to reduce the effects of noise. If the number of steps in the quantiser is constant, there is apt to be produced the subjective effect of a regular pattern which impairs the apparent quality of the picture.

A further object of the invention is, therefore, to provide an improved quantiser for television signals.

According to the present invention there are provided means for quantising a television signal, and means for varying the number of amplitude levels available in the quantiser in inverse relation to the number of significant amplitude changes in the television signal in a given interval of time.

When the invention is applied to the reduction of bandwidth, there are provided means for generating from the quantised signal pulses which are representative of the quantised signal and which are uniformly spaced in time over substantial time intervals, which may be equal to the aforesaid time interval. The time interval is conveniently the line or frame scanning period.

Figure 1:
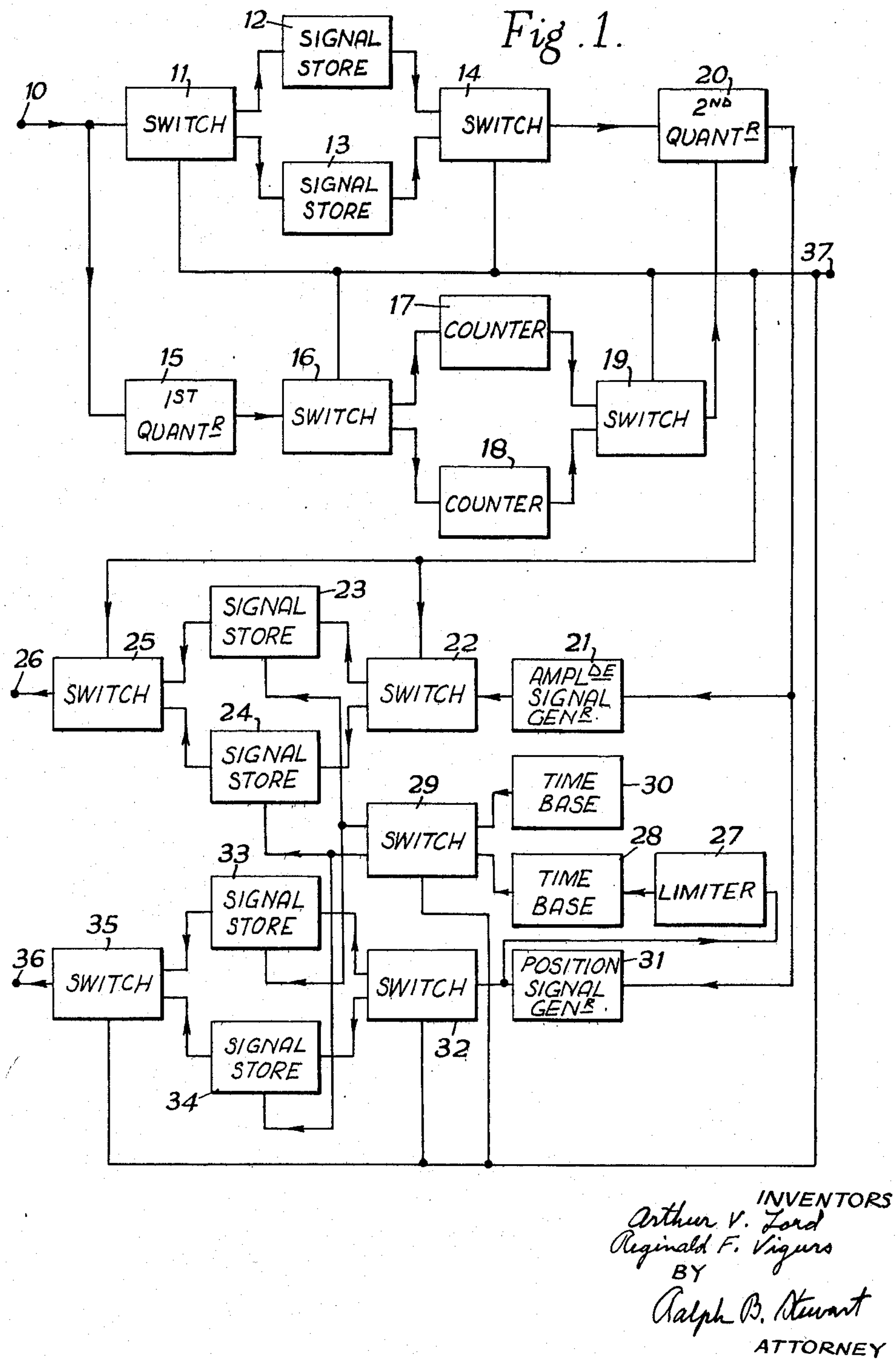
Figure 2:
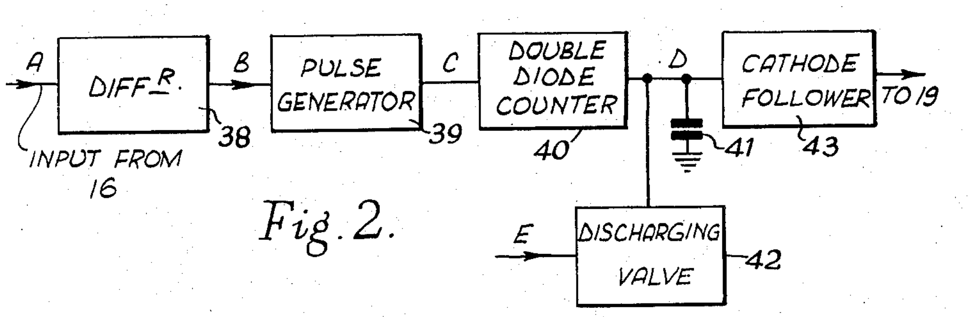
Figure 3:
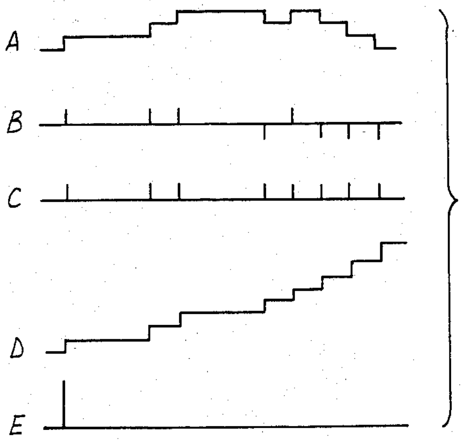
Figure 5:
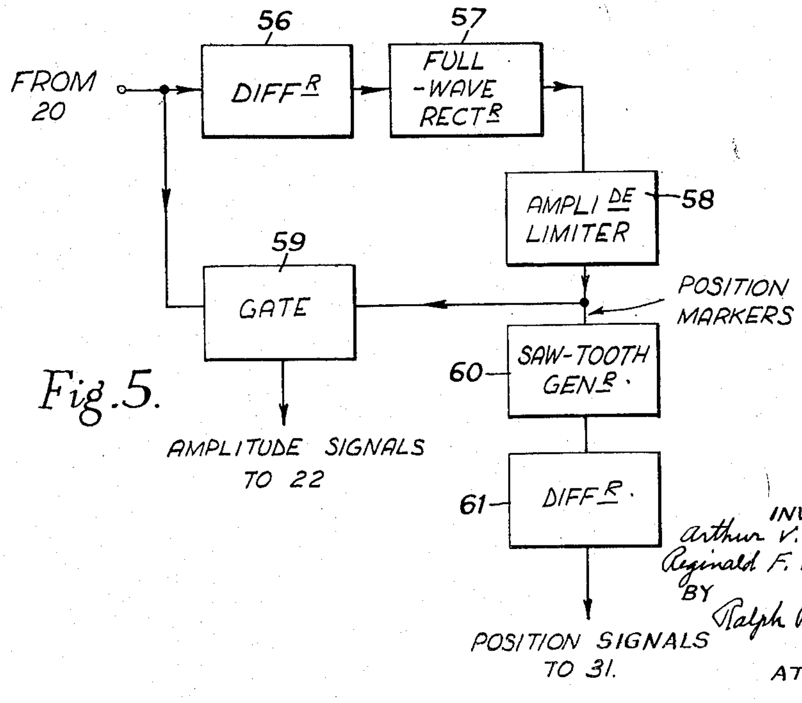
Figure 4:
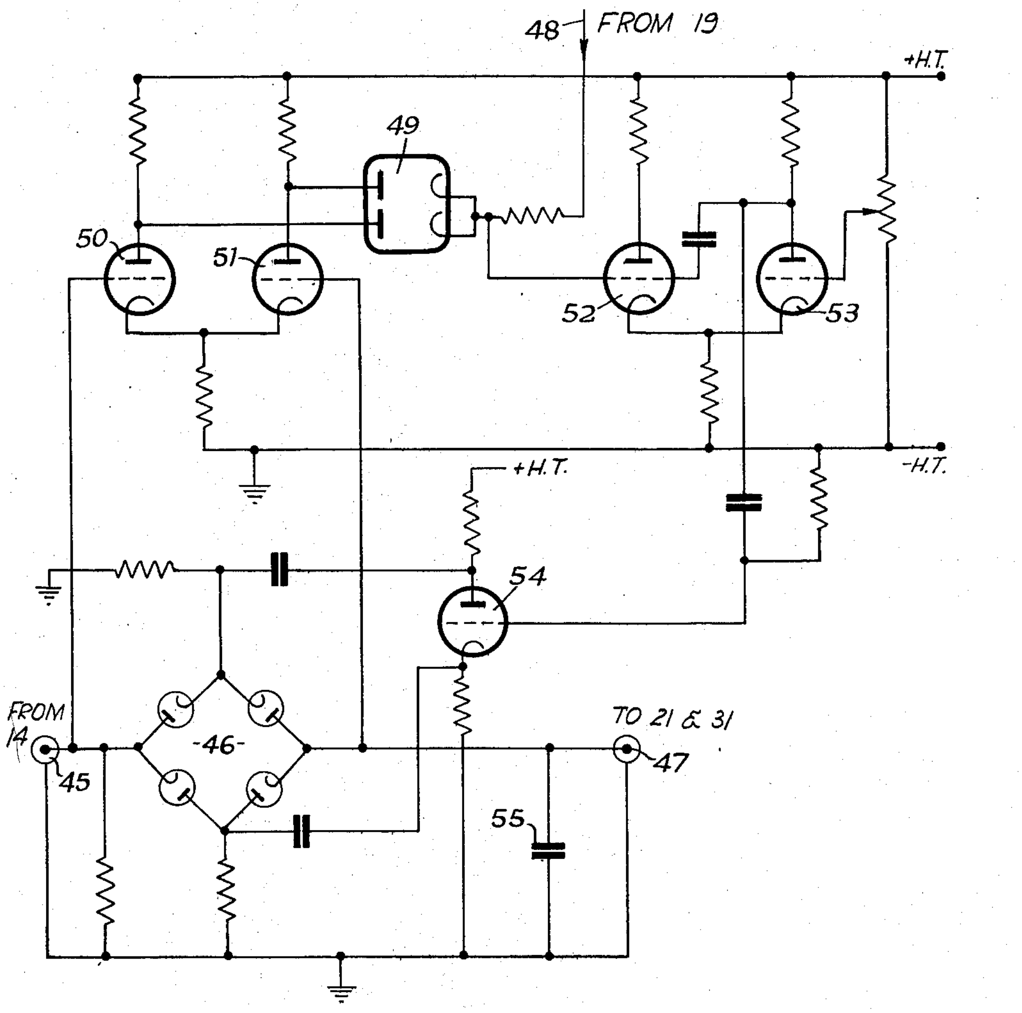

The invention will be described by way of example with reference to the accompanying drawings in which:

FIG. 1 is a block circuit diagram of one embodiment of the invention as applied to compression of band-width, FIG. 2 is a block circuit diagram showing one form that the counters in FIG. 1 may take, FIG. 3 is a waveform diagram showing waveforms occurring at various points in FIG. 2, these waveforms being indicated by corresponding letters in the two figures, FIG. 4 is a circuit diagram of one form that the quantiser 20 in FIG. 1 may take, and FIG. 5 is a block circuit diagram showing one form that the amplitude and position signal generators of FIG. 1 may take.

For the purpose of converting irregularly spaced pulses into pulses that are uniformly spaced over a period, such as a line or frame period, the embodiment of FIG. 1 makes use of a number of signal storage devices which may for example be in the form of iconoscopes in which during one such period the signal is stored on a screen in the form of electrostatic charges, and during the next succeeding period the signal is read off. In each case the storage devices are duplicated and switches are provided in order that while one storage device is storing signals, signals are being read from the other storage device. For convenience it will be assumed that the said period is a line period although a longer period, such as a frame period, is often preferable.

Referring now to FIG. 1, television signals are applied at a terminal 10 to a switch 11, two storage devices 12 and 13 and a second switch 14. Signals from the terminal 10 are also applied to a first quantiser 15, the output of which is connected through a switch 16 to two counters 17 and 18. The outputs of the counters 17 and 18 are switched by a switch 19 alternately to a second quantiser 20 to control the number of possible amplitude levels (or in other words the amplitude of individual steps) in this quantiser 20. Signals from the switch 14 are applied to the quantiser 20. The switches 11, 14, 16 and 19 are all operated by suitable switching pulses of line frequency applied to a terminal 37 in such a manner that the signals are fed alternately through the storage devices 12 and 13 and the counters 17 and 18.

The first quantiser 15 is arranged to have the maximum number of levels which are ever required. The counter 17 or 18 counts the number of amplitude changes in one line of the signal from the first quantiser 15 and generates a control voltage dependent upon this number. The control voltage is applied to the quantiser 20 in such a way that when the number of amplitude changes from 15 is large the number of amplitude levels provided by the quantiser 20 is small, and vice versa.

While a signal, representing in this case one line of a picture, is being stored in the store 12, a previously-stored line is being read from the store 13. Under these conditions, therefore, the switch 11 connects the terminal 10 to the store 12 and the switch 14 connects the store 13 to the quantiser 20. Similarly while signals of one line from the quantiser 15 are being counted by the counter 17, a control voltage developed in the counter 18 during the previous line is controlling the quantiser 20.

The quantised signals from the quantiser 20 are dealt with as follows. An amplitude signal generator 21 generates a train of pulses representative of the amplitude changes in the signal. These pulses are fed through a switch 22 alternately to two stores 23 and 24 one of which stores a signal while the other reproduces a previously-recorded signal. A switch 25 couples the stores 23 and 24 alternately to an output terminal 26. A position signal generator 31 under the control of quantiser 20 generates, as will be described later, pulses defining the times of occurrence of amplitude changes in the signals from the quantiser 20. These pulses are fed through an amplitude limiter 27 to a time base generator 28 which is a stepping integrator circuit whose output has the form of a staircase, each step of which occurs at the time of occurrence of a pulse from 27 and all the steps being of the same height. This time base waveform is used as the writing time base in the four cathode ray tube storage devices 23, 24, 33 and 34 and the reading time base for these stores is provided by a time base generator 30 generating a normal saw-tooth waveform. A switch 29 switches the two time base generators 28 and 30 at appropriate times to the four storage devices.

Since an effect of the control of the quantiser 20 according to the present invention is to ensure that the number of quanta per television line in the output from the quantiser 20 is approximately constant, the duration of the writing scan as defined by the time base waveform from 28 will also tend to be constant.

The time base generator 30 may be constitued in the same manner as the counter 17 or 18 to be described hereinafter with reference to FIGS. 2 and 3.

The position pulses from 31, whose amplitudes define the positions of amplitude changes in the quantised signal, are fed through a switch 32, alternately to the stores 33 and 34 and the signals read from these stores are available at a terminal 36.

The amplitude and position pulses appearing at terminals 26 and 36 respectively will thus be uniformly spaced in each line scanning period.

The signals from the terminals 26 and 36 may be transmitted in any convenient way.

Instead of two cathode ray tube storage devices, as described, it will be evident that a single cathode ray tube with two beams, namely a writing and a reading beam may be used.

Moreover for the signal stores 12 and 13 of FIG. 1 a delay line may be used instead of the cathode ray tube storage device or devices. In this case the provision of the two channels each containing a storage device and the switching means for switching from one store to the other is unnecessary.

Referring to FIGS. 2 and 3, each of the counters 17 and 18 of FIG. 1 may be constituted by differentiating means 38 producing a waveform B, a pulse generator 39 producing a positive pulse for each pulse in B, and a double diode counter 40 producing the stepped waveform D which is applied to charge a capacitor 41. A discharging pulse E derived from the line synchronising signal is applied through a discharging valve 42 to discharge the capacitor 41 at the beginning of each alternate line. The output may be taken through a cathode follower 43 to the switch 19 in FIG. 1.

The steps in the waveform are all of the same height and the voltage across the capacitor 41 at the end of each scanning line will be proportional to the number of quantum changes from the first quantiser 15 during that line. The voltage on the capacitor 41 of one counter, say 17, derived in scanning one line, say the first line, is applied to the quantiser 20 during the scanning of the second line. This capacitor is then discharged and receives the waveform D during the third line. The voltage on the capacitor 41 of the counter 18 is applied to the quantiser 20 during the scanning of the first and third lines.

One form that the quantiser 20 of FIG. 1 may take is shown in FIG. 4. Signals from the switch 14 in FIG. 1 are applied through a coaxial cable 45 to a diode gate 46 and thence to an output coaxial cable 47 which constitutes the output of the quantiser 20 of FIG. 1. The control voltage from the switch 19 in FIG. 1 is applied at 48 to the common cathodes of a double diode 49 having its anodes connected respectively to the anodes of two valves 50 and 51 forming a balanced amplifier. The input and output coaxials 45 and 47 are connected to the control grids of the valves 50 and 51.

Whenever the difference between the voltages at the grids of the valves 50 and 51 exceeds a predetermined value which is dependent upon the voltage at 48, a positive voltage is applied to a multivibrator constituted by two valves 52 and 53 which is thereby triggered and generates a pulse which is applied to a phase-splitter valve 54 having its anode and cathode connected across the gate 46. The voltages then applied to the gate 46 open the gate and the voltage across a capacitor 55 then assumes the value of the voltage at the input terminal 45.

One form that the amplitude and position signal generators 21 and 31 of FIG. 1 may take is shown in FIG. 5. Signals from the quantiser 20 of FIG. 1 are applied to a differentiator 56 which generates a pulse whenever there is a change in amplitude of the signals. These pulses are positive and negative according to the sense of the amplitude changes and are converted into unidirectional pulses by a full wave rectifier 57 and an amplitude limiter 58. The pulses thus produced are known as position markers. They are of constant amplitude and sense and occur at each change of signal amplitude.

The position markers are applied, on the one hand, to open a gate 59 which then passes signals from the quantiser 20 to the switch 22 in FIG. 1. The amplitude of the pulses passed by the gate 59 is representative of the amplitude of the quantised signal at the instants of occurrence of the position markers.

The position markers are also applied to a saw-tooth generator 60 to initiate the fly-back of a saw-tooth wave. The amplitude of the saw-tooth wave at the moment when the fly-back occurs is a measure of the duration of the brightness level attained at the time of occurrence of the position marker immediately preceding that producing the fly-back under consideration.

The saw-tooth waveform is differentiated in 61 to produce short pulses whose amplitude defines the durations of brightness levels.

We claim:

1. Apparatus comprising a signal input terminal, a signal quantiser coupled to the terminal for quantising the signal at a plurality of discrete amplitude levels, counting means coupled to the input terminal and responsive to the number of significant amplitude changes in said signal in a given time interval to produce a control voltage in accordance therewith, and means coupling said counting means to said quantiser to control the number of said levels in inverse relation to the number of said amplitude changes, and means coupled to the output of the quantiser for deriving a quantised representation of the input signal.

2. Apparatus for translating a television signal comprising a quantiser controlled by said signal and generating an output at a plurality of discrete amplitude levels, counting means controlled by said signal and generating a voltage dependent upon the number of amplitude changes of a predetermined amount occurring in said signal in a given time interval, and means applying the output voltage of said counting means to said quantiser to vary said plurality of levels in inverse relation to the number of said amplitude changes, and means coupled to the output of the quantiser for deriving a quantised signal representing the television signal.

3. Apparatus for translating a television signal comprising a first quantiser controlled by said signal and generating a quantised output, said quantiser having means for varying the number of amplitude levels in dependence upon an applied control voltage, a second quantiser controlled by said signal and generating a stepped waveform, counting means controlled by said second quantiser and generating an output voltage dependent upon the number of steps in said stepped waveform in a given time interval, and means applying the output voltage of said counting means to the level control means of said first quantiser, and means coupled to the output of the first quantiser for producing signals representative of the amplitude level of the quantised television signal.

4. Apparatus for compressing the bandwidth of a signal comprising a quantiser for quantising a signal at a plurality of discrete amplitude levels, said quantiser having an input, an output and a control terminal, counting means having an input and an output and generating a voltage in said output dependent upon the number of amplitude changes of predetermined amount in a given time at the input thereof, means for applying said signal to the said inputs of said quantiser and counting means, means coupling the output of said counting means to said control terminal to vary the number of amplitude levels of said quantiser in inverse relation to the number of said amplitude changes in said given time, and means coupled to the output of said quantiser for generating pulses representative of the signal amplitude at the output of the quantiser and uniformly spaced in time over substantial intervals of time.

5. Apparatus for compressing the bandwith of a signal comprising a signal source, a quantiser coupled to the source for quantising the signal at a plurality of discrete amplitude levels, said quantiser including control means to vary the number of discrete amplitude levels at which said quantising is effected, counting means controlled by said input signal and producing an output voltage dependent upon the number of amplitude changes of predetermined amount occurring in said signal in a given time, means coupling the output of said counting means to said quantiser control means to vary the number of amplitude levels of said quantiser in inverse relation to the number of said amplitude changes in said given time, and means coupled to the output of said quantiser for generating uniformly spaced pulses over intervals of time which are equal to said given time, said pulses being representative of the signal amplitude level at the output of the quantiser.

References Cited in the file of this patent

UNITED STATES PATENTS

| | | |
|---|---|---|
| 2,629,771 | Anderson et al. | Feb. 24, 1953 |
| 2,681,385 | Oliver | June 15, 1954 |
| 2,721,900 | Oliver | Oct. 25, 1955 |
| 2,725,425 | Sziklai | Nov. 29, 1955 |
| 2,732,424 | Oliver | Jan. 24, 1956 |